(12) United States Patent
LeBlanc et al.

(10) Patent No.: US 8,364,128 B2
(45) Date of Patent: Jan. 29, 2013

(54) SYSTEM AND METHOD FOR CENTRALLY DISTRIBUTING MOBILE CONTENT

(75) Inventors: Michael LeBlanc, Fredericton (CA); Jody Daniel Glidden, Sterling, VA (US); Jacob Samuel O'Reilly, Fredericton (CA)

(73) Assignee: Research In Motion Limited, Waterloo, Ontario (CA)

( * ) Notice: Subject to any disclaimer, the term of this patent is extended or adjusted under 35 U.S.C. 154(b) by 149 days.

(21) Appl. No.: 12/948,084

(22) Filed: Nov. 17, 2010

(65) Prior Publication Data
US 2011/0130125 A1 Jun. 2, 2011

Related U.S. Application Data

(60) Provisional application No. 61/265,924, filed on Dec. 2, 2009.

(51) Int. Cl.
*H04W 4/00* (2009.01)
(52) U.S. Cl. ............... 455/414.1; 455/414.2; 455/414.3; 455/414.4
(58) Field of Classification Search ............... 455/414.1, 455/414.2, 405, 414.3, 414.4; 705/7, 14
See application file for complete search history.

(56) References Cited

U.S. PATENT DOCUMENTS

| | | | |
|---|---|---|---|
| 6,512,922 B1 | 1/2003 | Burg et al. | |
| 6,622,016 B1 | 9/2003 | Sladek et al. | |
| 6,788,939 B2 | 9/2004 | Truong et al. | |
| 7,010,500 B2 | 3/2006 | Aarnio | |
| 7,734,731 B2 | 6/2010 | Ordille et al. | |
| 7,765,164 B1 | 7/2010 | Robinson et al. | |
| 7,774,812 B2 | 8/2010 | Knudson et al. | |
| 2008/0209061 A1 | 8/2008 | Shenfield | |
| 2009/0030757 A1* | 1/2009 | Admon et al. | 705/7 |
| 2009/0068998 A1 | 3/2009 | Widmark et al. | |

FOREIGN PATENT DOCUMENTS

| | | |
|---|---|---|
| WO | 2007074459 A2 | 7/2007 |
| WO | 2008134880 A1 | 11/2008 |
| WO | 2009100539 A1 | 8/2009 |

OTHER PUBLICATIONS

Extended European Search Report issued by the European Patent Office dated Feb. 24, 2011 for corresponding European Patent Application No. 10191479.4.

* cited by examiner

*Primary Examiner* — David Q Nguyen
(74) *Attorney, Agent, or Firm* — Gowling Lafleur Henderson LLP

(57) ABSTRACT

There are provided methods, systems, devices and computer program products for distributing mobile content, on behalf of mobile content providers, to mobile devices. A central mobile content delivery system and a central mobile content delivery store system are provided. Interfaces permit a mobile content provider to author and publish mobile content in association with subscription data. Content offers may be defined from such data and offered to mobile device user subscribers such as in a catalog system. Content is delivered on behalf of the content providers in accordance with the subscriptions concluded by the store system. Subscriptions may relate to single packages of mobile content or a plurality of packages (e.g. in a series of publications) such as previously or subsequently published mobile content. Subscriptions are provided to the central delivery system to assign and deliver mobile content to devices.

30 Claims, 5 Drawing Sheets

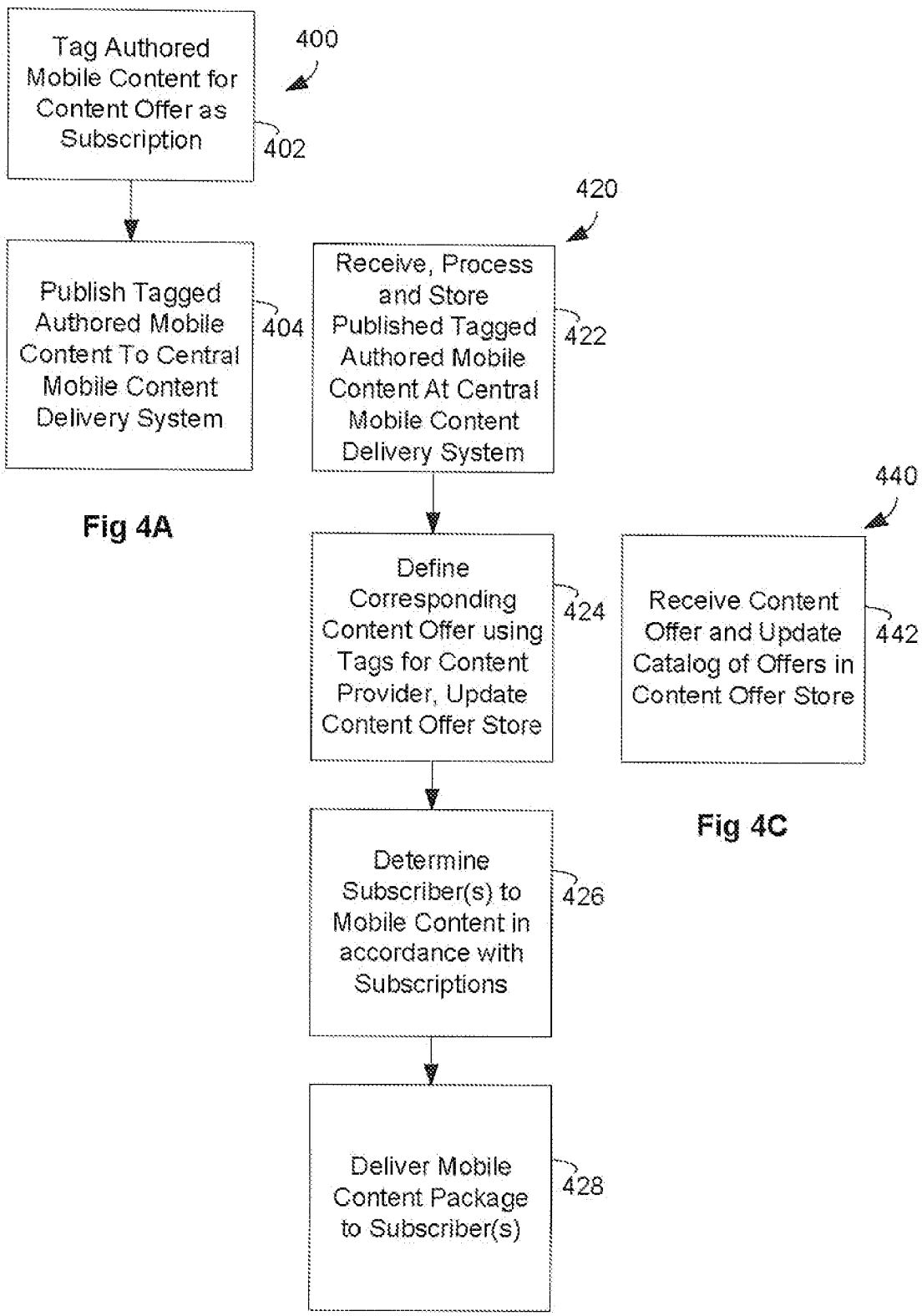

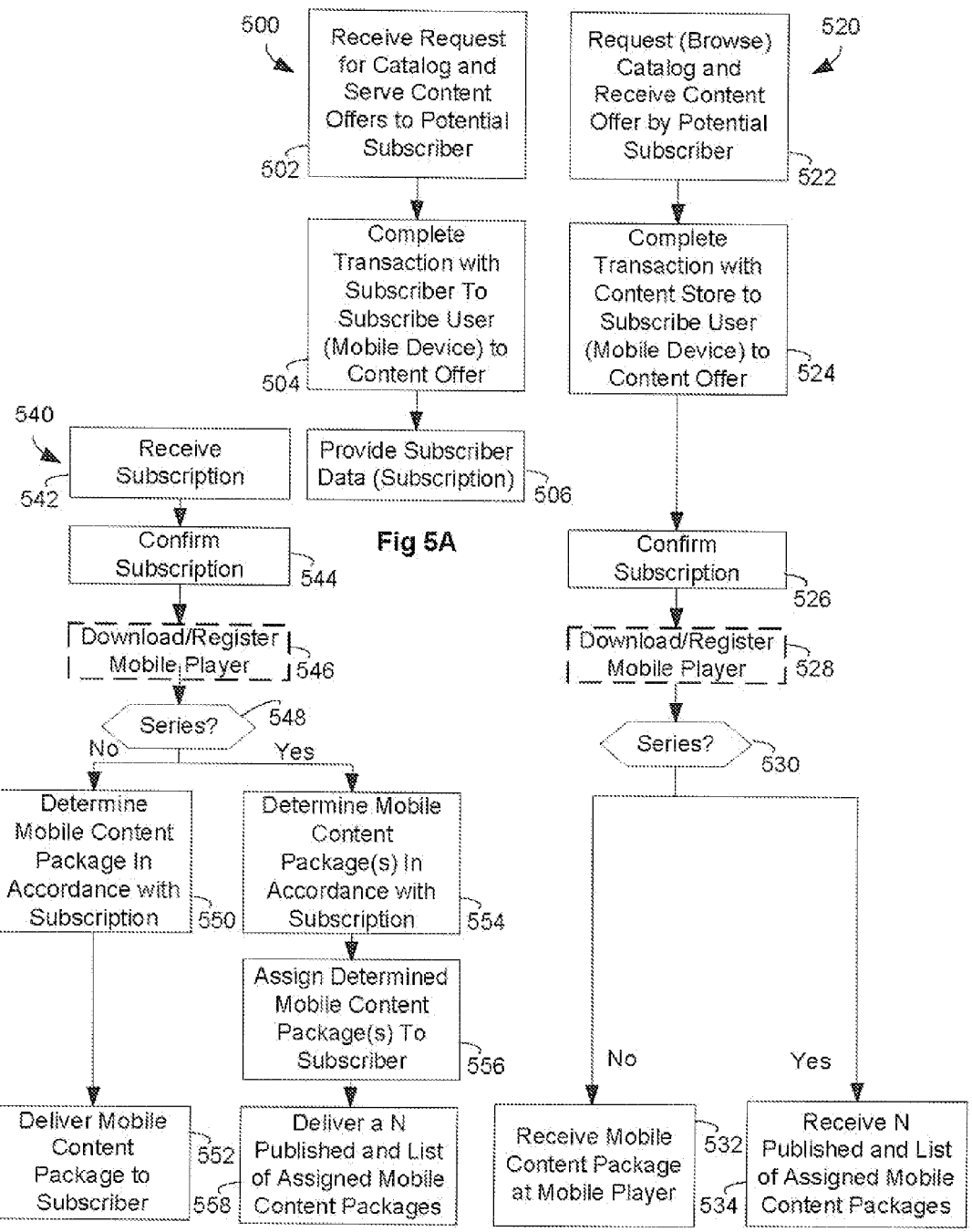

SYSTEM AND METHOD FOR CENTRALLY DISTRIBUTING MOBILE CONTENT

CROSS-REFERENCE

This application claims the benefit of U.S. Provisional Application No. 61/265,924 filed Dec. 2, 2009 pursuant to 35 U.S.C. 119 (e).

FIELD

The present disclosure relates generally to making content available for communication to a client device, particularly a wireless mobile device and to the delivery of such content.

BACKGROUND

Communication devices, particularly wireless communication devices are useful to receive and present content (e.g. information in one or more files) to users of such devices. Components of a content delivery system such as a content server and a client device may be configured to automatically communicate new content to a user. The content may be packaged and delivered from a content server for presentation by an application (e.g. a player) on such a client device. Mobile application stores offer applications including productivity applications, games, reference and e-Books, entertainment applications and others for downloading by mobile devices. Such stores provide application developers providers with a distribution model, for example, including catalog and ecommerce services and solutions, that is scalable and reliable and independently hosted.

BRIEF DESCRIPTION OF THE DRAWINGS

The disclosure will now be described by way of example only with reference to the following drawings in which:

FIGS. 4A, 4B, 4C, 5A, 5B and 5C are flow charts showing operations of various components of the system of FIG. 3 in accordance with one embodiment.

DETAILED DESCRIPTION

Figure 1:
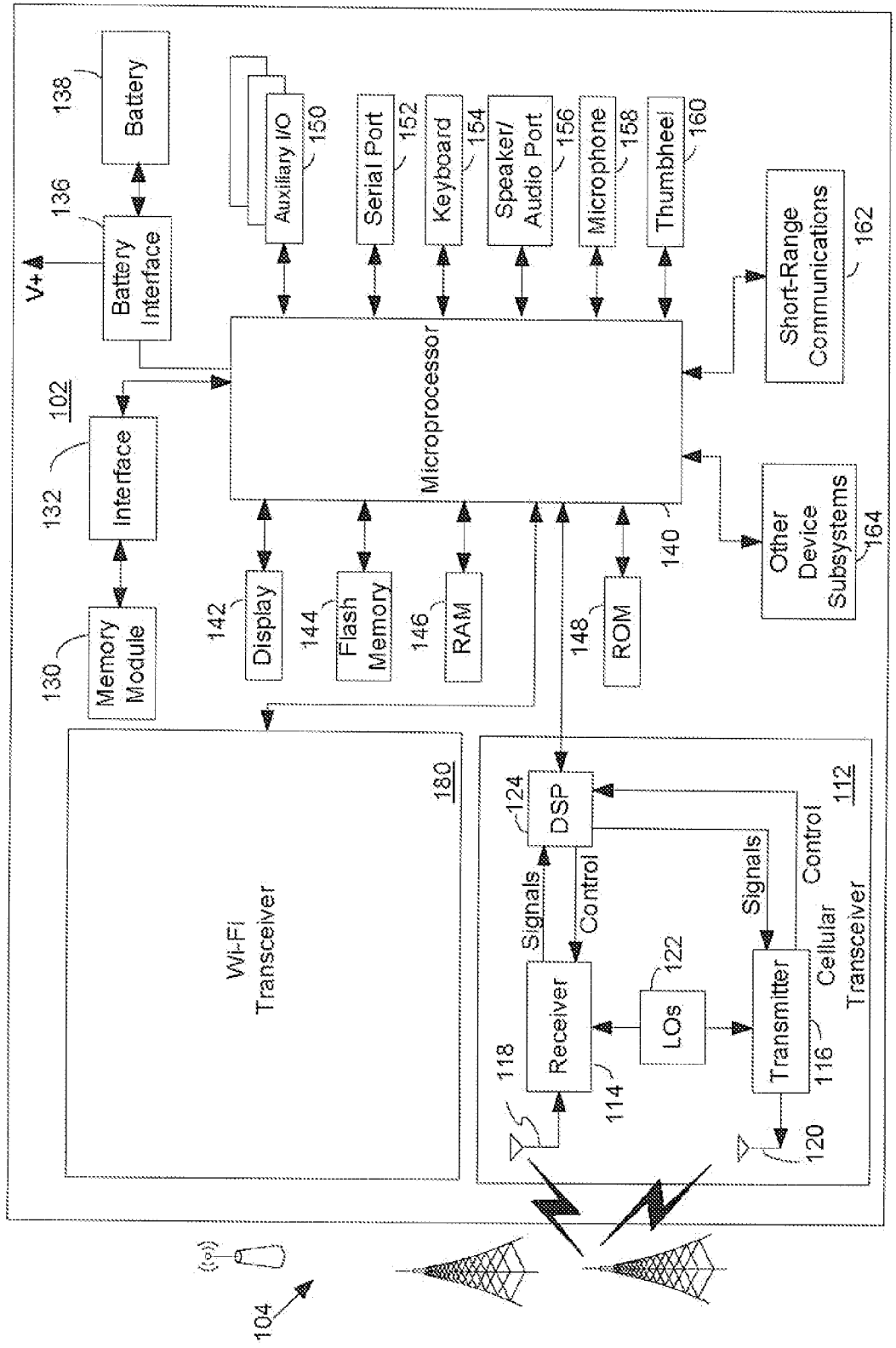
FIG. 1 is a block diagram illustrating a wireless device suitable for receiving content in accordance with one embodiment.

There are provided methods, systems, devices and computer program products for distributing mobile content, on behalf of mobile content providers, to mobile devices. A central mobile content delivery system and a central mobile content delivery store system are provided. Interfaces permit a mobile content provider to author and publish mobile content in association with subscription data. Content offers may be defined from such data and offered to mobile device user subscribers such as in a catalog system. Content is delivered on behalf of the content providers in accordance with the subscriptions concluded by the store system. Subscriptions may relate to single packages of mobile content or a plurality of packages (e.g. in a series of publications) such as previously or subsequently published mobile content. Subscriptions are provided to the central delivery system to assign and deliver mobile content to devices.

There is provided a method for centrally distributing mobile content for delivery to mobile devices, the method comprising: receiving mobile content and associated subscription data from respective content providers, the subscription data for defining content offers and subscriptions, on behalf of said content providers, for subscribers to receive said mobile content; storing said mobile content for delivery to respective mobile devices of said subscribers in accordance with respective subscriptions; forwarding the subscription data to a mobile content store system on behalf of said content providers, said store system providing the content offers to deliver the mobile content to subscribers and completing respective subscriptions to receive the mobile content in accordance with the content offers; and receiving respective subscriptions from said mobile content store system for configuring delivery of mobile content to said mobile devices.

There is provided a central mobile content delivery system comprising a processor and memory coupled thereto; a communications subsystem for communicating with: at least one mobile content provider system for content providers to author and publish mobile content, at least one mobile content store system for offering the mobile content for delivery to mobile devices in accordance with concluded subscriptions therefor; and at least one mobile devices to delivery mobile content according to the subscriptions; and a storage subsystem for storing the mobile content received; the central mobile content delivery system configured by one or more subsystems and/or components to: receive mobile content and associated subscription data from respective content providers, the subscription data for defining content offers and subscriptions, on behalf of said content providers, for subscribers to receive said mobile content; store said mobile content for delivery to respective mobile devices of said subscribers in accordance with respective subscriptions; forward the subscription data to a mobile content store system on behalf of said content providers, said mobile content store system providing the content offers to deliver the mobile content to subscribers and completing respective subscriptions to receive the mobile content in accordance with the content offers; and receive respective subscriptions from said mobile content store system for configuring delivery of mobile content to said mobile devices.

There is provided a computer program product comprising a memory storing instructions and data to configure a processor of a central mobile content delivery system to perform the method aspect.

There is provided a further method aspect, namely, a method of publishing mobile content for distribution to a mobile device. The method comprises associating subscription data with particular authored mobile content, said subscription data comprising information for defining a content offer and a subscription to receive the mobile content at a mobile device; and publishing the mobile content and associated subscription data to a central mobile content delivery system configured to: store said mobile content on behalf of content providers and deliver said mobile content to mobile devices in accordance with respective subscriptions therefor; forward said subscription data on behalf of content providers to a mobile content store system, said store system providing the content offers to deliver the mobile content to subscribers and completing respective subscriptions to receive the mobile content in accordance with the content offers; and receive respective subscriptions from said mobile content store system for configuring delivery of mobile content to said mobile devices.

There is provided a second computing device aspect. The computing device comprises a processor and a memory, said memory storing instructions and data to configure the processor, when executed to provide a mobile content provider system to perform the method of the second method aspect. There is provided a corresponding computer program product.

There is provided a third method aspect, computing device aspect and computer program product aspect. The method aspect relates to distributing mobile content on behalf of others and comprises receiving subscription data for defining a content offer to deliver mobile content in association with a subscription; completing a subscription with a subscriber to deliver the mobile content; and forwarding the subscription to a central mobile content delivery system, said system delivering the mobile content in accordance with the subscription.

There is also provided a communications system for distributing mobile content to mobile devices. The communication system comprises: at least one computing device configured as a mobile content delivery system in accordance with the respective system and method aspects therefor; at least one computing device configured as a mobile content provider system with the respective system and method aspects therefor; and at least one computing device configured as a mobile content store system with the respective system and method aspects therefor; wherein said computing devices cooperate to deliver mobile content to a plurality of mobile communication devices in accordance with subscriptions therefor.

These and other aspects will be apparent to persons of ordinary skill from the description and figures herein.

Reference is first made to FIG. 1, which shows a block diagram illustrating a portable wireless device 102 that is suitable for receiving content in accordance with one aspect of the present disclosure. The wireless device 102 communicates through a wireless communication network 104. The wireless network 104 includes antenna, base stations, and supporting radio equipment as for supporting wireless communications between the wireless device 102 and other devices connected to wireless network 104. The wireless network 104 may be coupled to a wireless network gateway and to a wide area network, shown in FIG. 2.

In one embodiment, the wireless device 102 is a two-way communication device having at least voice and/or data communication capabilities, including the capability to communicate with other computer systems. In one embodiment, the wireless device 102 is a handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), or a portable media or music player. The wireless device 102 may communicate with any one of a plurality of fixed transceiver stations within its geographic coverage area.

The wireless device 102 may incorporate a one or more communication subsystems 112, 180. Communication subsystem 112 comprises a receiver 114, a transmitter 116, and associated components, such as one or more antenna elements 118 and 120, local oscillators (LOs) 122, and a processing module such as a digital signal processor (DSP) 124. In one embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access (WAN) may be associated with a subscriber or user of the wireless device 102 via a memory module, such as a memory module 130, which may be a Subscriber Identity Module (SIM) card for use in a GSM network or a USIM card for use in a UMTS. The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems. Device 102 may include a Wi-Fi transceiver 180 that may comprise similar components/chipsets to subsystem 211 adapted for one or more Wi-Fi protocols. Though Wi-Fi is shown, WiMAX is one alternative transceiver. In some embodiments, device 102 may be capable of both Wi-Fi and WiMAX communications in accordance with software-defined radio ("cognizant radio") techniques.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a Universal Serial Bus (USB) port 152, a keyboard or keypad 154, a speaker or audio port 156 for connecting to, for example a set of headphones, a microphone 158, a clickable thumbwheel, trackball, or set of scroll buttons 160, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the display 142, and the clickable thumbwheel 160, for example, may be used for both communication-related functions, such as entering a text message for transmission over the wireless network 104, and executing device-resident functions such as a calculator or task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the wireless device 102 may also compose data items, such as email messages, for example, using the keypad 154 and/or the clickable thumbwheel 160 in conjunction with the display 142 and possibly the auxiliary I/O device 150. The keypad 154 may be either a complete alphanumeric keypad or telephone-type keypad.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the display 142 may also be used to provide an indication of the identity of a calling party, duration of a voice call, or other voice call related information. Stereo headphones may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information, media file, or software downloads to the wireless device 102 other than through the wireless network 104.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™. communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as 802.11b, 802.11 g, and/or 802.11n.

Figure 2:
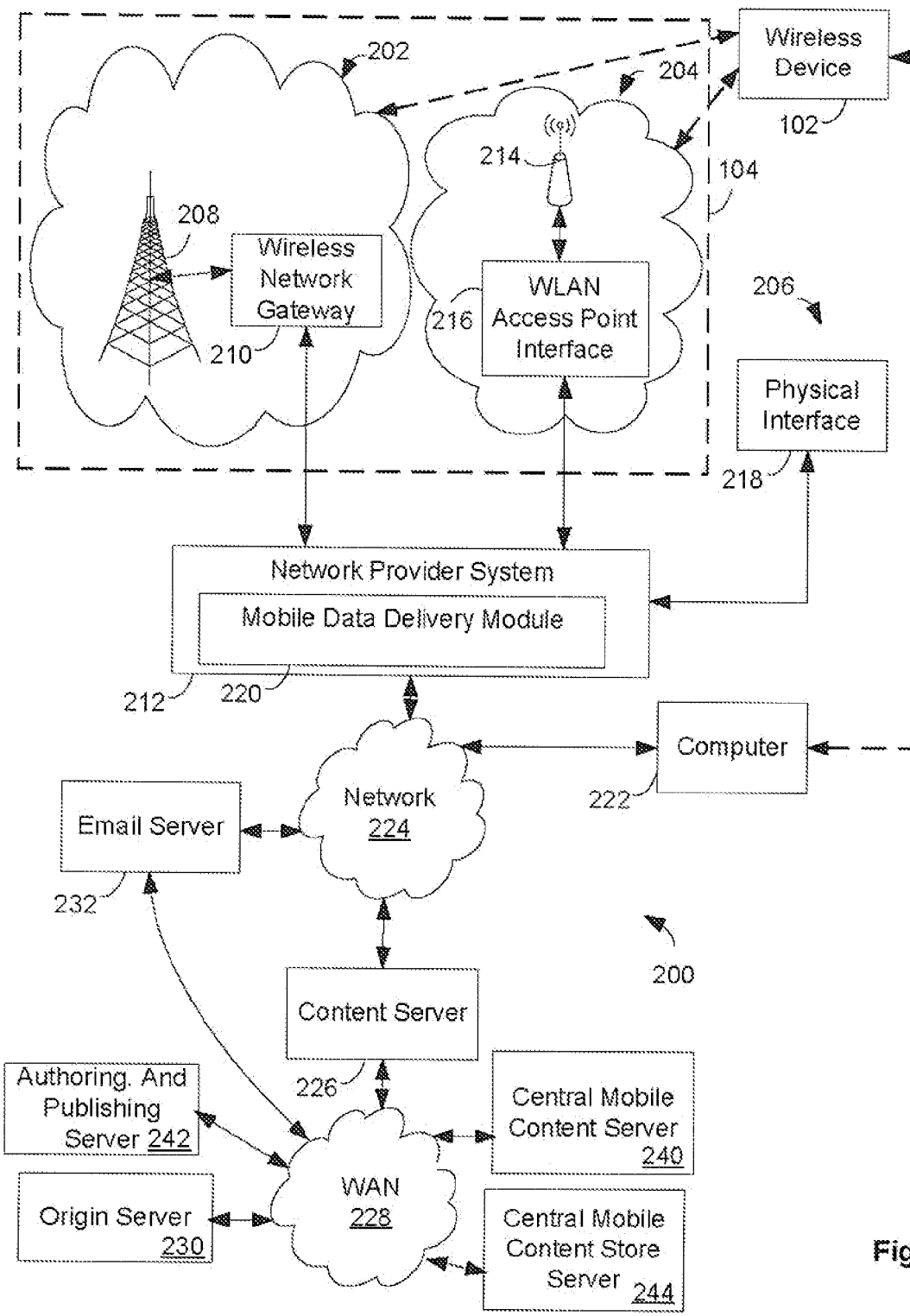
FIG. 2 is a block diagram of a communication system suitable for providing the operating environment of the device of FIG. 1 in accordance with one embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), Third Generation Partnership Project (3GPP or 3G), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as 802.11b, 802.11 g, and/or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to one embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In one embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 may be temporarily and directly connected to the computer 222 using, for example, the serial port 152. This direct connection may make use of a cradle or docking station connected to a serial port of the computer 222, where the mobile device 102 is placed in the cradle, therefore completing the serial connection between the mobile device 102 and the computer 222. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228 (e.g. via a firewall (not shown)). In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to one embodiment, mobile data delivery module 220 provides connectivity between wireless WAN 202 and the WLAN 204 and the other connection 206 and devices and/or networks connected directly or indirectly to the network provider system 212. In one embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Wireless devices 102 may have data connectivity to WAN 228 and to one or more servers on said networks. For example, as described further herein below, devices 102 may be subscribed to receive content from a central content delivery system server 240. Mobile content may be authored by one or more authoring and publishing system servers 242 by content providers and published to central content delivery system server 240. The authored content may be tagged, by content providers for example, to define subscription data for defining content offerings and subscriptions for mobile device users (i.e. subscribers). The subscription data may be forwarded automatically by the central mobile content delivery system 240 to the mobile content store server 244 for automatic provisioning of content offerings and for defining subscriptions on behalf of content providers. Mobile content store server 244 may make available content offerings to subscribers and potential subscribers via a catalog-type service or other on-line (e.g. Web-based) service. Mobile content store server 244 may be configured to define subscriptions, for example, conducting an ecommerce transaction, with or without payment requirements, in accordance with the content provider's tagged subscription data for the respective content, to complete a subscription. Subscriptions may be provided to central content delivery system server 240. Central content delivery system server 240 may receive subscriptions and assign content to subscribers and deliver such content to the subscriber's mobile devices accordingly. The content may comprise existing content in its central store and new content as it is published, in accordance with those subscriptions.

The various servers and wireless devices, computers and other devices referenced in association with the content authoring, publishing, subscribing and distribution systems and methods herein may be respectively configured using programmable devices and software components stored to memory devices. For example, wireless device 102 may comprise a memory having various software components for controlling the wireless device 102. The memory may include, for example, the flash memory 144, the RAM 146, the ROM 148, the memory module 130 and/or the other device subsystems 164. In accordance with one embodiment, the wireless device 102 is intended to be a multi-tasking wireless communications device configured for sending and receiving data items and for making and receiving voice calls that also includes various applications enabling users to listen to music, watch video files, play games, view picture files, surf the internet wirelessly, etc. To provide a user-friendly environment to control the operation of the wireless device 102, an operating system (OS) resident on the wireless device 102 provides a basic set of operations for supporting various applications typically operable through a graphical user interface (GUI). For example, the operating system provides basic input/output system features to obtain input from the auxiliary I/O 150, the keypad 154, the clickable thumbwheel 160, and other input devices, and to facilitate output to the user via the display 142. The GUI is typically a component of the operating system. One or more software modules for managing communications or providing a personal digital assistant (PDA) or other functions may also be included. The memory also includes an email and calendar client, which may be combined in, for example, a PIM application having email-based calendaring and scheduling functions. Typically, the PIM is installed as one of the software modules.

Figure 3:
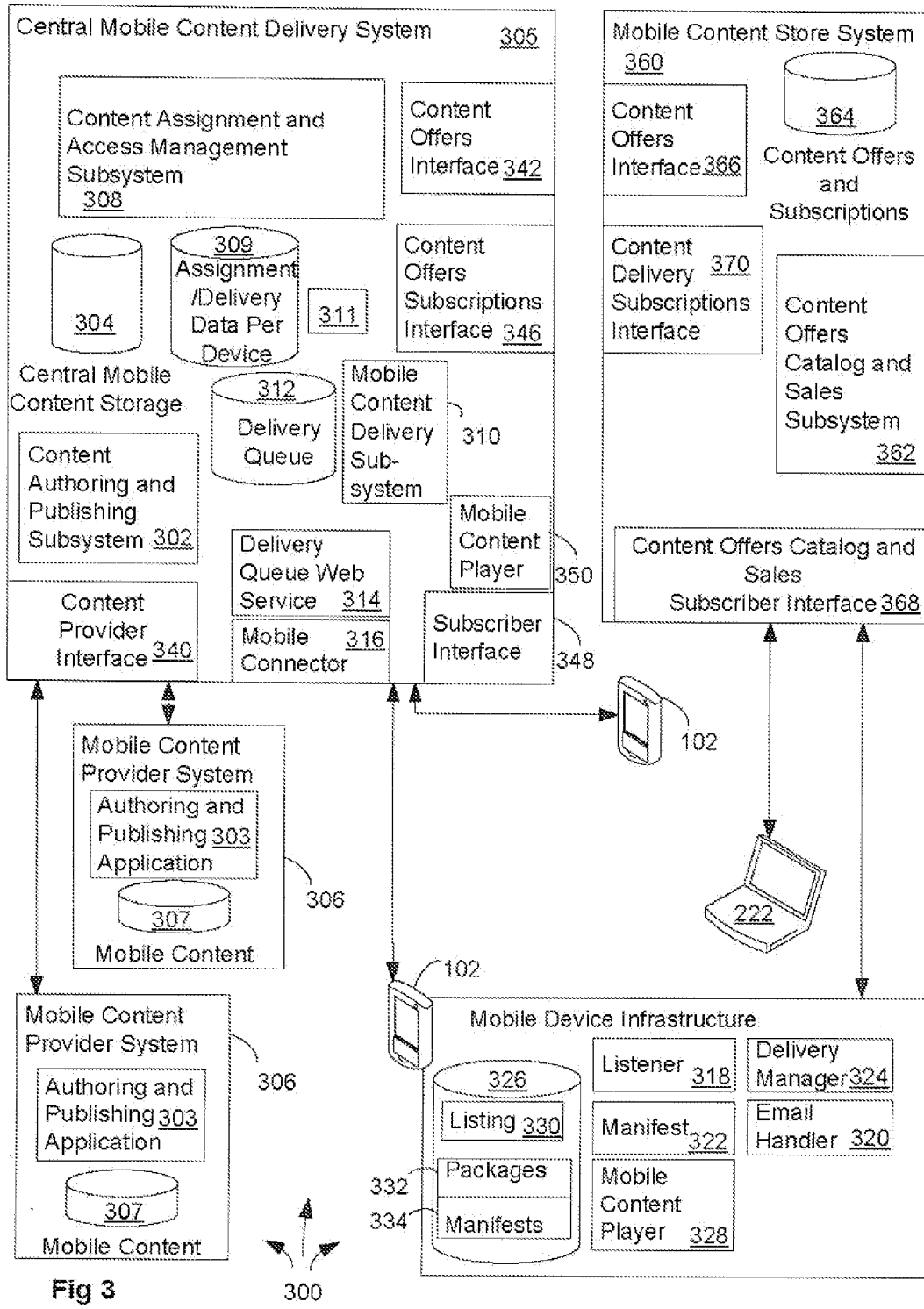
FIG. 3 shows in block diagram form the communication system of FIG. 2 and the device of FIG. 1 configured to provide content to the wireless device utilizing a store system in accordance with one embodiment.

The mobile device also includes a mobile content player, which may also be referred to as a content delivery module. In one example, the mobile content player may be integrated into the operating system. Alternatively, the module may be a separate software component, as illustrated in FIG. 3. The mobile content player may be responsible for managing content delivery from the perspective of the wireless device 102 and/or playing the content, which may include interactive components, on the wireless device 102. The device 102 may further comprises a content listing for the device 102 and one or more respective content packages and respective manifests describing the content of the content packages (e.g. URLs for retrieval of the component content of a package as further described below), received from central content delivery server 240. Operation of the mobile content player will be described in more detail below, in connection with FIG. 3.

Thus, the wireless device 102 includes computer executable programmed instructions for directing the wireless device 102 to implement various applications. The programmed instructions may be embodied in the one or more software modules resident in the memory of the wireless device 102. Alternatively, the programmed instructions may be tangibly embodied or stored on a computer readable medium (such as a DVD, CD, floppy disk or other storage media) which may be used for transporting the programmed instructions to the memory of the wireless device 102. Alternatively, the programmed instructions may be embedded or carried in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users. Similarly, components of servers 240, 242 and 242 may be provisioned in respective memory as software components as described further herein below.

The term "push" or "push delivery" is used herein to refer to a method of content delivery to a client device, such as a mobile wireless communication device describe above, that is automatically delivered by a content server upon the server's initiation and without any action being required on the part of a user of a wireless device 102. In brief, the content server initiates the delivery of the content to the waiting client device which is listening on a predetermined communication channel for notification of new content. It is contrasted with "pull delivery" whereby the client device periodically sends inquiries (i.e. polls) to the content server whether new content is available.

Reference is next made to FIG. 3, which shows in block diagram form a system for centrally delivering mobile content 300 comprising a plurality of mobile content provider systems 306, a plurality of mobile communication devices 102 (also referenced as wireless devices or client devices) a central mobile content delivery system 305 and a mobile content store system 360, configured for communication in a communications system of FIG. 2, to deliver mobile content to the wireless device 102 in accordance with one embodiment.

A mobile content provider system 306 comprises an authoring and publishing application 303 and a mobile content store 307, that allows a user to open an existing content file or create a new content file. In some embodiments, application 303 may comprise or be integrated into an application for document creation such as a presentation authoring application, such as, for example, Microsoft™ PowerPoint™, using an add-in application. In such embodiments, when the add-in is installed, a separate menu item can appear in the application's menus that provides the user with options for authoring, publishing and delivering the content. In some embodiments, content may be created in an application such as a slideshow or presentation application add-in. Mobile content may be published for delivery to mobile devices 102 via central mobile content delivery system 305 and mobile content store system 360 as described further herein below. One embodiment of mobile content provider system 306 is described in a co-pending PCT patent application no. PCT/CA2008/002275 entitled "A Method and System for Authoring Mobile Content in a Slideshow or Presentation Application for Direct Delivery to a Mobile Device", which is hereby incorporated by reference in its entirety. Such a mobile content provider system 306 may be adapted as further described herein to associate subscription data with the mobile content for defining a content offer and subscriptions to deliver the mobile content. Subscription data may be received via authoring and publishing application 303. Subscription data may be expressed in XML or other language as is well known.

Subscription data may comprise:
Offer/Subscription Name;
Subscription Price;
Currency;
Content Category or Subject/Topic;
Description of Mobile Content;
Content Provider Identification (ID);
Item/Subscription ID; and
Creation Date.

Other data may include content author, graphics such as thumbnail image for advertising the publication; etc. An example is:
Offer Name: Company XYZ Business Series
Subscription Price: $4.95
Currency: USD
Content Category Business
Description: The titles in this series relate to operating a small business
Content Provider ID: XYZ001
Item/Subscription ID: 999002
Creation Date Oct. 10, 2009

Mobile content providers (or others on their behalf) may register with and receive accounts with central mobile content store system 360 for hosting and providing content offers describing mobile content available for delivery. Store system 360 may be configured to complete subscriptions for such delivery, for example, concluding ecommerce transactions with users of mobile devices on behalf of the content providers. Content store system 360 may offer other types of mobile content such as applications (software) for mobile devices, accessories, etc.

The mobile content provider system 306 may allow interactive components to be included in the content, such as clickable activities, radio boxes, text boxes or the like. An interactive component will generally have one or more associated attributes. In some embodiments, the attributes can include the location of an activation area and possibly one or more commands to be executed when the activation area is selected by a user. For example, the interactive component may be a clickable activity where the activation area is activated when the user 'clicks' on the activation area. For example, the activation area may include a telephone number and clicking on the activation area may execute commands to initiate a telephone call or an SMS message to be sent to the number indicated. If the activation area includes an email address, clicking on the activation area could allow the user to compose an email to be sent to that address. As another example, the activation area could include a Universal Resource Locator (URL) which invokes a web browser when the area is activated by the user. Further examples could include launching a video or audio player or mapping coordinates or addresses. Where interactive components have been included in the content, the authoring system may determine the location of an activation area of an interactive component and provide this information along with any other attributes, such as associated commands, to central mobile content delivery system 305.

Central mobile content delivery system 305 may comprise a content authoring and publishing subsystem 302, central mobile content storage 304, a content assignment and access management subsystem 308, a mobile content delivery subsystem 310, a delivery queue 312, a delivery queue web service 314 and a mobile connector 316. Central mobile content delivery system 305 may comprise one or more interfaces for communicating with systems 306, 360 and/or devices 102 such as content provider interface 340, content offers interface 342, content offers subscription interface 346 and subscriber interface 348.

The content authoring and publishing subsystem 302 may be used to format, publish and/or centrally store in the central storage 304 new mobile content received from the mobile content provider system 306. Content authoring and publishing subsystem 302 may be implemented, for example, using a number of systems in the market today, which provide for creation and central storage of content formatted for wireless devices adapted as may be required. Alternatively, the content authoring and publishing subsystem 302 may be implemented using solutions yet to be developed.

The content authoring and publishing subsystem 302 may receive content files from one or more respective systems 306. Content authoring and publishing subsystem 302 may also include a reformatting component for formatting content for use by the wireless device 102. Content may, in one example, be described as one or more media types that when combined create a content package. This package may include, for example, text, images, video, and/or audio. The content package may also include information about embedded interactive components including the associated attributes. The content package may be stored in the central content storage 304 for later access. Authoring of some of the content may be accomplished by a different application and then saved to the central storage 304. For example, an audio clip may be authored in an audio editing tool, saved, and then published to a central content server, such as central storage 304. In some embodiments, another system (e.g. 308) may manage access to this content.

The content package may be assigned to users of mobile devices 102 (i.e. subscribers) for use (i.e. delivery to such user's devices) in accordance with subscriptions therefor. This assignment may function as a trigger for the delivery to occur. In one example, content assignment and access management subsystem 308 may make a request to the mobile content delivery subsystem 310 to send the content directly to a user's wireless device 102 (e.g. after the user has subscribed and, as may be necessary, downloaded and registered a mobile content player 350 via interface 348). This request may contain information identifying what type the content is (e.g., a mobile learning course) and target user information so the delivery can be directed to specific wireless devices 102 belonging to specific individual users. The request may also contain information that the content system 305 uses to find all elements of the content to be delivered (e.g. a manifest). The content assignment may not need any knowledge of the mobile transport platform being used, which may be configured in the mobile connector 316 and may be tied to a user's wireless device 102 type. Content assignment and access management subsystem 308 may maintain a store 309 (e.g. database) reflecting the published content, the users (subscribers) and the assignment of specific content packages to specific users. A server content listing 311 may be generated, on demand, for providing to a client device, for reconciling content packages that have been assigned to the client device (e.g. user) and actual content packages received at the device.

Delivery of mobile content to mobile devices is further described in co-pending U.S. provisional patent application No. 61/265,928 entitled "Reliable Delivery of a Push-State Aware Client Device", filed on even date herewith, namely Dec. 2, 2009, which is hereby incorporated by reference in its entirety.

Central mobile content delivery system 305, for example, subsystems 302 or 308 or another component of system 305 may also receive subscription data in association with the published mobile content. The subscription data may be forwarded to central store system 360, on behalf of the content providers for example, via content offers interface 342 for updating system 360, to define a content offer making mobile content available on behalf of the content provider as well as to define subscriptions to deliver the mobile content on behalf of the content provider. Central mobile content delivery system 305, for example, subsystems 302 may be also configured to receive subscriptions for mobile content delivery to specific subscribers via content offers subscription interface 346. Further description of mobile content store system 360 is provided herein below.

A subscription may comprise data identifying the user, the user's device and a mode of communication therewith (e.g. an email address may be sufficient), a content offer identification to identify the mobile content to be delivered (e.g. the content provider ID and item/subscription ID for an individual package of such content or a series of mobile content comprising a plurality of content packages of at least one of previously published mobile content and subsequent published mobile from a content provider) and optionally a number of previously published content packages from the subscription series to automatically deliver upon receipt of the subscription. In one embodiment, the subscription provided by system 360 comprises a user identification (e.g. email address), the content provider ID and the Item/Subscription ID which are used to identify published mobile content and trigger delivery. A subscription may be expressed using XML or another language.

The mobile content delivery subsystem 310 may receive requests to deliver new content. When these requests are received, the mobile content delivery subsystem 310 may look up the target and determine if the user has a wireless device 102 and if that device has a transport defined. The request may be verified to be in the proper format and then processed. If the user does not have a wireless device 102 or a transport has not been defined, then the appropriate response is returned to the requesting system. Every user may register with the mobile content delivery subsystem 310 (e.g. via interface 348) to ensure the deliveries can take place. Once this information is gathered, the mobile content delivery subsystem 310 may place the request onto the delivery queue 412 with a status indicated as "new". In one example, the request may be an XML request. As described briefly herein above, content assignment and access management subsystem 308 and/or mobile content delivery subsystem 310 may maintain data 309 per each client device 102 to monitor which content packages have been assigned to a particular client device 102 and may further monitor whether such content was delivered to such device 102. The data may be useful to generate and define content listings 311 for particularly devices, as needed, for example, in response to a device's request for reconciling to the device's local content listing 330. The server's content listing for a device may facilitate reconciliation with the content listing 330 maintained by the device 102.

The delivery queue web service 314 may listen for requests made by the mobile connector 316. These requests may determine if there are items on the queue 312 that the mobile connector 316 is able to extract and deliver. Delivery queue web service 314 may also provide the server's content listing for a device in response to a request from mobile connector 316.

The mobile connector 316 may poll the delivery queue web service 314 in predefined intervals to see if there is any content available that needs to be delivered. The mobile connector 316 may issue a web services call to the delivery queue web service 314. This call may contain user credentials that the web service 314 authenticates to determine what queue items the mobile connector 316 is authorized to see. If there are no items authorized, the mobile connector 316 may wait for a predefined time interval to elapse and try again. If the mobile connector 316 does find an item on the queue, the mobile connector 316 may retrieve the queued item as, for example an XML document that describes the content. The mobile connector 316 may only process one queued item at a time, but may alternatively be configured to process multiple items at a time.

When the mobile connector 316 receives an XML transaction from the web service 314, the mobile connector 316 looks up the intended transport for the wireless device 102 type and delivers to the wireless device 102. The mobile connector 316 may further return result codes back to the delivery queue web service 314 based on the ability of the mobile connector 316 to successfully send the delivery request to the wireless device 102 infrastructure. Such codes may be useful for the web service 314 and/or mobile content delivery system 310 to update data 309 and thereby maintain current data for defining listings 311.

The mobile connector 316 may work simultaneously with several mobile platforms or transport types. This may include any transport that allows a real-time delivery of content to the wireless device 102, or any mechanism that publishes the content directly to the wireless devices 102 wirelessly.

The wireless device 102 generally includes a listener 418, an email handler 320, a manifest 322, a delivery manager 324, local storage 326 and a mobile content player 328.

The listener 318 may listen for the request sent (in accordance with push delivery) from the mobile connector 316. The request can comprise a manifest file 322 (e.g. an XML manifest) including a content URL for each component of the content package. The listener 318 may receive the manifest 322 and extract each content URL. The listener 318 may then send each content URL to the delivery manager 324 for retrieval from the central storage 304 using the content URLs. Manifest 322 may be stored to local storage 326 (e.g. manifests 334).

If a request is received via e-mail, the wireless device 102 processes the e-mail through the email handler 320. The email handler 320 decrypts the contents of the email, if encrypted, that contain the instructions for retrieving the manifest 322, reads the e-mail information into memory, and then deletes the e-mail from the user's wireless device 102 email inbox. The email handler 320 uses the information stored in memory to make an HTTP request to the central mobile content delivery system 305 requesting the manifest 322. If authorized (e.g. comparing user's e-mail and PIN to store values therefor and/or other subscription related data), it sends the manifest to the mobile device 102 through its HTTP response.

The delivery manager 324 may process a manifest file 322 by retrieving each item specified by URL in the manifest file 322 from the central content storage 304. These items may be placed in the wireless device local device storage 326 (e.g. packages 332). Once content is delivered to the wireless device 102, the content remains in the local storage 426 for the mobile content player 428 to render it.

The mobile content player 328 may be programmed to render various content types on the mobile device. The mobile content player 328 may also be programmed to render the interactive components, for example, by rendering an activation area on the visual representation of the content based on a location attribute determined previously and received as part of the content package. The mobile content player 328 may be programmed to detect when an activation area has been selected (e.g. clicked on) by a user of the wireless device and to execute any associated commands.

One aspect of the present application may make use of caching servers (not shown) for content delivery to the wireless devices 102. When a delivery occurs, the content may be retrieved from a local caching server instead of the centralized content server 305.

Mobile content store system 360 may comprise a content offers catalog and subscription subsystem 362 and store 364 for data comprising content offers, subscription terms for concluding subscription and concluded subscriptions for delivery of mobile content to subscribers. Other data stored by server 360 may comprise accounts for mobile content providers and/or mobile content delivery system 305, for example, to authorize access to interfaces 366 and 370. Content offers interface 366 provides access to system 30 to receive subscription data on behalf of mobile content providers to define new or update existing content offers, subscription terms, etc. Content offers subscriptions interface 370 provides subscriptions to mobile content delivery system 305 for delivering content to mobile devices 102 on behalf of mobile content providers. The interface may require authorization for use and be secured (e.g. TLS or other).

A content offers catalog and sales subsystem 362, for example a Web-based ecommerce oriented system, provides access to subscribers (and potential subscribers) to content offers and to complete subscriptions for the delivery of mobile content. Access may be provide via subscriber interface 368. In one embodiment, interface 368 may be configured to provide access to mobile devices 102 as well as personal computers/laptops and other larger format computing devices (e.g. 222) for completing subscriptions. Interface

368 may also provide subscriber access (e.g. a MySubscriptions interface) to manage (update) subscriptions/account at store system 360. As noted, particular mobile content may be offered by a mobile content provider to subscribers in a single package or as one of a plurality of packages in a series of publications, for example, related to a particular subject or from a particular author, etc. The a content offer for a series may comprise an offer to deliver (or otherwise make available for subsequent delivery) at least one of: any existing one or more packages of mobile content previously published for the series or any yet to be published (i.e. subsequently published) one or more content packages of mobile content. Subscription term may include a cost/price component. While some mobile content may be offered to subscribers for free (i.e. no subscriber cost for the content), others may have a one-time or a periodic payment term. The content offers may be organized and presented in a catalog-type manner or other manner for browsing and selecting by subscribers.

Though not shown, subsystem 362 may have one or more electronic interfaces to third-party payment systems (e.g. credit card, PayPal™, etc.) for conducting financial transactions when completing subscriptions for mobile device users/subscribers. (It is understood however that mobile content providers may set subscription terms that have no cost/price for particular mobile content.) Subsystem 362 may have accounting and reporting features/applications/interfaces (not shown) for providing accounts and reports to mobile content providers (e.g. operators of systems 306) and/or operators of mobile content delivery system 305, etc. and/or for setting up or managing accounts for same as well.

While the mobile content delivery system 305 and mobile content provider system 306 and mobile content store system 360 are represented as distinct components and have a number of sub-components and/or sub-systems, any of these components or subcomponents may be implemented as modules running on a number of interconnected servers or on a single server, depending on the design criteria of a particular application. For example, any of the components of the systems may be implemented on any of the network provider system 212, the network 224, the content server 226, the email server 232, or the origin server 230 or respective servers 240, 242 and 244. Alternatively, in one example, the components thereof may be implemented on a single one of the network provider system 212, the network 224, the content server 226, the email server 232, or the origin server 230.

Representative operations of system 300 will be described with reference to FIGS. 4A,4B,4C and 5A,5B and 5C. Considering FIGS. 4A,4B,4C, there is shown flow charts of operations 400, 420 and 440 of systems 306, 305 and 360 respectively in accordance with one embodiment. With reference to system 306, FIG. 4A shows operations 400 comprising blocks 402 and 404. At block 402, mobile content (e.g. authored at system 306) is "tagged" with subscription data for defining content offers and subscription. As noted previously, the subscription data may be defined in XML and tagging refers to defining XML or similar tags and/or generally the receiving and associating of such data with mobile content by system 306. At 404, the mobile content and associated subscription data is published (including delivered or otherwise uploaded) to system 305.

With reference to system 305, FIG. 4B shows operations 420 comprising blocks 422 to 428. At block 422, the published mobile content and associated tagged subscription data is received, for example via interface 340 to subsystem 302 for storing to store 304. The mobile content is processed, if necessary, and readied to be delivered as a content package as described previously. The mobile content (for example in original and processed or only in processed form) is stored. At block 424, the subscription data is processed, for example to define a content offer for mobile content store system 360. Subscription data may be supplemented with predefined data previously stored to system 305 for a particular mobile content provider. The content offer may comprise a description for the content (text and/or graphics and/or audio etc.) as well as subscription terms for completing subscriptions. The system 360 is updated via outbound interface 342.

Subscription data or other associated data published with mobile content may serve to identify the content as a part of a series of published content. The series may have one or more existing subscribers having subscriptions for the mobile content represented in system 305. At blocks 426 and 428, subscribers to the newly received content are identified (e.g. by subsystem 308 using data 309) and mobile content delivered accordingly via subsystem 310, queue 312, service 314 and connector 316 described above.

With reference to system 360, FIG. 4C shows operations 440 comprising block 442. There, system 360 receives a content offer via interface 366 and updates the store 364. In one embodiment, system 360 may receive unprocessed subscription data from system 305 on behalf of the mobile content provider and system 360 may define the content offer from such data and any previously predefined data stored to system 360, for example. By way of example, earlier subscription data may define a content offer for a series of publications. Subsequent subscription data for a particular instance of mobile content may identify the content as a part of the earlier defined series, such as by reference to a series code or other identifier. Similarly, subscription data may reference the mobile content provider by reference to a predefine code rather than include specific descriptions with each subscription data. The defined and stored content offer is ready for presenting to subscribers.

Considering FIGS. 5A, 5B and 5C, there is shown flow charts of operations 500, 520 and 540 of system 360, device 102 and system 305 respectively in accordance with one embodiment. With reference to system 360, FIG. 5A shows operations 500 comprising blocks 502, 504 and 506. At block 502, system 360 receives a request to serve (a browse) at least a portion of the catalog of content offers (e.g. via subscribers interface 368) to a potential subscriber. At block 504, a subscription is completed with the subscriber, with or without a payment portion as per the subscription terms of the content offer. As may be necessary, the subscriber's device and/or mode of delivery (transport) is identified. A new subscriber may require additional information than an existing subscriber. An existing subscriber may have subscriber data (e.g. an account) previously stored to system 360. At block 506, the subscription is provided, e.g. via interface 370, to system 305.

With reference to device 102, FIG. 5B shows operations 520 comprising blocks 522 to 534. At block 522, mobile device 102 requests (browses) a portion of the catalog of system 360 and receives at least one content offer. At block 524, a subscription is completed e.g. via ecommerce transaction, with or without payment as set by the subscription terms. In the present embodiment, at block 526, the subscription is confirmed. Confirmation may comprise responding to an email, clicking a link therein, and registering to mobile content delivery system 305. Optionally, at block 528, such a response may invoke a download and registering of a content player to receive content.

In one embodiment, depending upon the subscription concluded (decision 530), via No branch to block 532 a subscription for a single mobile content package may trigger delivery of the package. Via Yes branch to block 532, a subscription to a series of packages may trigger delivery of a number N (N=1 or more) previously published mobile content packages from the series and a content listing 330 of mobile content packages assigned to the device 102. Player 328 may be configured to present the listing of assigned packages and facilitate downloading, for example in response to user input. The content listing approach reduces bandwidth as well as mobile device resource consumption at first subscription to a series as numerous packages in a series may not be delivered immediately. Such approach also reduces (spreads out) server resource consumption for system 305. In one embodiment, N=1 and the most current package may be delivered automatically. In one embodiment, N may be configurable by user option such as at the time of subscription such that the subscription received by system 305 from system 360 includes data for N.

With reference to system 305, FIG. 5C shows operations 540 comprising blocks 542 to 558. At block 542, the subscription is received, for example via interface 346 to subsystem 308. Assignment of mobile content to device 102/subscriber is triggered and data 309 updated. Assignment may be pending confirmation of subscription at block 544. Confirmation may involved the optional downloading and registering of player 350 via interface 348. Such may be optional as a prior subscribing device 102 and system 305 may detect the presence of the player 328 at the device and not require a subsequent download.

Depending on the subscription ("Series?" decision at block 548), via No branch, system 305 may determine and deliver a single previously published content package via blocks 550 and 552. Via Yes branch, system 305 may determine a plurality (N as described above) of content packages and assign same to the subscriber, and deliver the N packages and a content listing 311 via blocks 554, 556 and 558. In one embodiment, where N=1, the most current package may be delivered. In one embodiment, N may be configurable by user option such as at the time of subscription such that the subscription received by system 305 from system 360 includes data for N.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

What is claimed is:

1. A method for centrally distributing mobile content for delivery to mobile devices, the method comprising:
   at a mobile content provider server device, receiving mobile content and associated subscription data from respective content providers, the subscription data defining content offers and including terms for defining a subscription to receive a plurality of respective content packages comprising the mobile content and at least one of previously published mobile content and subsequently published mobile content defining a series of publications, on behalf of said content providers, for subscribers to receive said mobile content;
   storing, at the mobile content provider serve device, said mobile content for delivery to respective mobile devices of said subscribers in accordance with respective subscriptions;
   forwarding the subscription data to a mobile content storage server device on behalf of said content providers, said storage server device providing the content offers to deliver the mobile content to subscribers and completing respective subscriptions to receive the mobile content in accordance with the content offers; and
   receiving, at a central content delivery server device, respective subscriptions from said mobile content storage server device for configuring delivery of mobile content to said mobile devices.

2. The method of claim 1 wherein the subscription data comprises information describing the mobile content for defining a. content offering and information describing subscription terms for concluding an ecommerce transaction.

3. method of claim 1 wherein the mobile content comprises interactive components.

4. The method of claim 1 comprising assigning mobile content to subscribers in accordance with said subscriptions and delivering said mobile content.

5. The method of claim 4 comprising defining a content package from said mobile content and delivering the mobile content in accordance with a push delivery model for delivering content packages.

6. The method of claim 5 wherein a particular subscription is associated to a plurality of mobile content defining respective content packages and wherein delivering comprises delivering a one of said content packages and a list of assigned mobile content for subsequent retrieval by said mobile device.

7. The method Of claim 5 comprising defining a manifest for said content package and push delivering said manifest to the mobile device to enable retrieval of said content package.

8. The method of claim 5 comprising defining said content package in response to a typo of mobile device to which the content package is delivered.

9. The method of claim 1 composing downloading a mobile content player to the mobile device and registering said player to receive and play mobile content.

10. A central mobile content delivery system comprising:
    a processor and memory coupled thereto;
    a communications subsystem for communicating with;
    at least one mobile content provider system for content providers to author and publish mobile content,
    at least one mobile, content store system for offering the mobile content for delivery to mobile devices in accordance with concluded subscriptions therefor; and
    at least one mobile device for delivery of mobile content according to the subscriptions; and
    a storage subsystem for storing the mobile content received;
    the central mobile content delivery system configured by one or more subsystems and/or components to;
    receive mobile content and associated subscription data from respective content providers, the subscription data defining content offers and including terms for defining a subscription to receive a plurality of respective content packages comprising, the mobile content and at least one of previously mobile content and subsequently published mobile content defining a series of publication, on behalf of said content providers, for subscribers to receive said mobile content;
    store said mobile content for delivery to respective mobile devices of said subscribers in accordance with respective subscriptions;
    forward the subscription data to a mobile content store system on behalf of said content providers, said mobile content store system providing the content offers to deliver the mobile content to subscribers and completing respective subscriptions to receive the mobile content in accordance with the content offers; and receive respective subscriptions from said mobile content store system for configuring delivery of mobile content to said mobile devices.

11. The central mobile content delivery system of claim 10 further configured to assign mobile content to subscribers in accordance with said subscriptions and delivering said mobile content.

12. The central mobile content delivery system of claim 11 further configured to define a content package from said mobile content and deliver the mobile content in accordance with a push delivery model for delivering content packages.

13. The central mobile content delivery system of claim 12, wherein a particular subscription is associated to a plurality of mobile content defining respective content packages and further wherein when delivering in response to a new subscription to to plurality of mobile content, the central mobile content delivery system is configured to deliver a one of said content packages and a list of assigned mobile content for subsequent retrieval by said mobile device.

14. The central mobile content delivery system of claim 12 further configured to define a manifest for said content package and push deliver said manifest to the mobile device to enable retrieval, of said content package.

15. The central mobile content delivery system of claim 11 further configured to define said content package in response to a type of mobile device to which the content package is delivered.

16. The central mobile content delivery system of claim 10 further configured to download a mobile content player to the mobile device and register said player to receive and play mobile content.

17. A computer program product comprising a memory storing instructions and data to configure a processor of a central mobile content deliver system to perform the method of claim 1.

18. A method of publishing mobile ccmtent for distribution to a mobile device comprising:
at a mobile content storage server device, associating subscription data with particular authored mobile content, said subscription data comprising information defining a content offer and including terms for defining subscription to receive a plurality of respective content package comprising the mobile content and at least one of previously published mobile content and subsequently published mobile content defining a series of publications to receive the mobile content at a mobile device;
publishing the mobile content and associated subscription data to a central mobile content delivery server device configured to; store said mobile content on behalf of content providers and deliver said mobile content to mobile devices in accordance with respective subscriptions therefor; forward said subscription data on behalf of content providers to a mobile content store system, said store system providing the content ofters to deliver the mobile content to subscribers and completing respective subscriptions to receive the mobile content in accordance with the content offers; and receive respective subscriptions from said mobile content store system for configuring delivery of mobile content to said mobile devices.

19. The method of claim 18 wherein the subscription data comprises either a) terms for defining a subscription to receive an individual content package comprising only the mobile content; or b) terms for defining a subscription to receive a plurality of respective content packages comprising the mobile content and at least one of previously published mobile content or subsequently published mobile content defining a series of publications; or both a) and b).

20. The method of claim 19 wherein the subscription data comprises pricing terms for the subscription.

21. The method of claim 19 comprising defining the subscription data to associate the mobile content with a publication series comprising a plurality of respective content packages each comprising associated mobile content.

22. A computing device having a processor and a memory, said memory storing instructions and data to configure the processor, when executed to provide a mobile content provider system to perform the method of claim 21.

23. A computer program product comprising a memory storing instructions and data to configure a processor of a computing device to provide a mobile content provider system to perform the method of claim 18.

24. A method of distributing mobile content on behalf of others comprising;
receiving subscription data at a mobile content server device, subscription data defining a content offer and including terms for defining a subscription to receive a plurality of respective content packages comprising the mobile content, and at least one of previously published mobile content and subsequently published mobile content defining a series of publications to deliver mobile content in association with a subscription;
completing at the mobile content server device, a subscription with a subscriber to deliver the mobile content; and
forwarding the subscription to a central mobile content delivery server device, said central mobile content delivery; server device delivering the mobile content in accordance with the subscription.

25. The method of claim 24 wherein the subscription data comprises either a) terms for defining a subscription to receive an individual content package comprising only the mobile content; or b) terms for defining a subscription to receive a plurality of respective content packages comprising the mobile content and at least one of previously published mobile content or subsequently published mobile content defining a series of publications; or both a) and b) wherein the method comprises defining the content offer accordingly.

26. The method of claim 24 comprising;
providing an electronic catalog of content offers to subscribers;
receiving a selection of a particular content offer front a subscriber; and
conducting an ecommerce transaction to complete the subscription for the particular content offer.

27. The method of claim 24 wherein the subscription data comprises terms to associate the mobile content in a series of publications comprising at least one of previously published mobile content and subsequently published mobile content.

28. The method of claim 27 wherein a subscription subscribes for delivery of any previously published and any subsequently published content in the series.

29. A computing device having a processor and a memory, said memory storing instructions and data to configure the processor, when executed to provide a mobile content store system to perform the method of claims 27.

30. A computer program product comprising a memory storing instructions and data to configure a processor of a computing device to provide a mobile content store system to perform the method of claim 27.

* * * * *